United States Patent [19]

Bhagwat et al.

[11] Patent Number: 5,013,993
[45] Date of Patent: May 7, 1991

[54] THERMALLY RESPONSIVE BATTERY CHARGER

[75] Inventors: Pradeep M. Bhagwat, Baltimore, Md.; Daniel S. Daniel, Knoxville, Tenn.; Samuel G. Woods, Baltimore, Md.

[73] Assignee: Black & Decker Inc., Newark, Del.
[21] Appl. No.: 237,962
[22] Filed: Aug. 29, 1988

Related U.S. Application Data

[63] Continuation-in-part of Ser. No. 93,435, Sep. 4, 1987.
[51] Int. Cl.$^5$ .................................................. H02J 7/00
[52] U.S. Cl. ........................................ 320/35; 320/31
[58] Field of Search ...................... 320/35, 36, 31, 39

[56] References Cited

U.S. PATENT DOCUMENTS

| | | |
|---|---|---|
| 3,320,508 | 5/1967 | Bradshaw et al. . |
| 3,440,517 | 4/1969 | Page et al. . |
| 3,539,898 | 11/1970 | Tolmie . |
| 3,599,071 | 8/1971 | Lapuyade et al. . |
| 3,614,583 | 10/1971 | Burkett et al. . |
| 3,708,738 | 1/1973 | Crawford et al. ...................... 320/9 |
| 3,723,849 | 3/1973 | Ludloff . |
| 3,746,961 | 7/1973 | Dobie . |
| 3,889,171 | 6/1975 | Hunter, Jr. . |
| 3,917,990 | 11/1975 | Sherman, Jr. . |
| 3,935,525 | 1/1976 | Elson et al. . |
| 4,006,397 | 2/1977 | Catotti et al. . |
| 4,019,100 | 4/1977 | Barrus . |
| 4,045,720 | 8/1977 | Alexandres . |
| 4,125,802 | 11/1978 | Godard . |
| 4,209,736 | 6/1980 | Reidenbach . |
| 4,220,909 | 9/1980 | Piteo . |
| 4,240,022 | 12/1980 | Kilinskis et al. . |
| 4,321,523 | 3/1982 | Hammel . |
| 4,370,606 | 1/1983 | Kakumoto et al. . |
| 4,382,221 | 5/1983 | Reynolds . |
| 4,394,127 | 7/1983 | Emerle et al. . |
| 4,424,476 | 1/1984 | Mullersman . |
| 4,433,277 | 2/1984 | Carollo et al. . |
| 4,468,605 | 8/1984 | Fitzgerald et al. . |
| 4,472,672 | 9/1984 | Pacholok . |
| 4,491,903 | 1/1985 | Montague . |
| 4,544,876 | 10/1985 | Bailey et al. ...................... 320/35 X |
| 4,560,915 | 12/1985 | Soultanian . |
| 4,609,861 | 9/1986 | Inaniwa et al. . |
| 4,616,171 | 10/1986 | Hernandez et al. . |
| 4,712,055 | 12/1987 | Houser, Jr. ............................. 320/35 |

FOREIGN PATENT DOCUMENTS

| | | |
|---|---|---|
| 0198707 | 10/1986 | European Pat. Off. . |
| 2526183 | 12/1976 | Fed. Rep. of Germany . |
| 2738977 | 3/1979 | Fed. Rep. of Germany . |
| 3345737 | 6/1985 | Fed. Rep. of Germany . |
| 2589292 | 4/1987 | France . |
| 1211439 | 11/1970 | United Kingdom . |
| 1354491 | 5/1974 | United Kingdom . |
| 1509567 | 4/1975 | United Kingdom . |
| 1604451 | 12/1981 | United Kingdom . |
| 2110013 | 6/1983 | United Kingdom . |
| 8802565 | 4/1988 | World Int. Prop. O. . |

OTHER PUBLICATIONS

Electronics, Jan. 22, 1968, pp. 97-100, "There's No Overcharge for Fast-Charged Batteries," by James V. Ball.
Application Engineering Handbook Supplement, General Electric Company, pp. 2-11 through 2-13, Copyright 1973.

Primary Examiner—R. J. Hickey
Attorney, Agent, or Firm—Barry E. Deutsch; J. Bruce Hoofnagle

[57] ABSTRACT

A battery charger 10 includes a capacitor 20 which establishes a level of current sufficient to fast charge in one-hour a battery 18 having from one to twenty cells. An SCR 16 is controlled by a timer 42 to initially delay the supply of current while determining whether the battery 18 is hot or cool. If battery 18 is cool, charger 10 proceeds to fast charge the battery. After battery 18 is fully charged, the battery heats to a temperature where a NTC thermistor 58 responds to trigger a second timer 52 which controls SCR 16 to stop the fast charging operation. Charger 10 is then controlled to prevent the charger from thereafter re-entering a fast charge mode.

If battery 18 is initially hot, charger 10 is controlled to further delay the initiation of a fast charge operation until the battery cools to or below the charge-start temperature.

A second NTC thermistor 90 is provided to compensate for the potential effect on the operation of thermistor 58 in response to temperature levels emanating from any environment other than from battery 18.

16 Claims, 2 Drawing Sheets

THERMALLY RESPONSIVE BATTERY CHARGER

CROSS REFERENCE TO RELATED APPLICATION

This application is a continuation-in-part of application Ser. No. 093,435, filed Sept. 4, 1987.

FIELD OF THE INVENTION

This invention relates to a thermally responsive battery charger and particularly relates to a battery charger for thermally responding to the temperature of a battery to be charged prior to and during a charging operation to control the charging of the battery.

BACKGROUND OF THE INVENTION

Currently available temperature-responsive fast battery chargers are designed to stop a fast-charge cycle when the battery reaches a predetermined temperature which is representative of the battery having attained full charge. In one design, a thermostat is contained within a package along with the battery. In a second design, the thermostat is contained within a charger base adjacent the location of the battery being charged.

In any event, when the supply of charging current continues after the battery has attained full charge, the temperature of the battery rises to a level whereby the thermostat opens and terminates the fast-charge operation. Users of this type of charger generally encounter no problems provided that the battery is sufficiently cooled when placed initially in the charger for the charging operation.

However, at times, a battery which is contained in a package with the thermostat may be at or above the trip temperature prior to insertion into the battery charger. In this condition, the thermostat will be open and will not allow the fast-charge cycle to begin until the battery cools sufficiently. Obviously, this delays the charging time and necessitates continued attendance by the user until the battery has cooled sufficiently to permit the charging cycle to begin assuming that the user is aware that the battery is hot.

If a heated battery is placed in a charger where the thermostat is contained within the charger base, the thermostat will require a finite period (perhaps one to two minutes) to respond to the heat of the battery before opening. During this finite period, a charge indicator is providing indication to the user that the fast-charge cycle has begun. Typically, the user proceeds with other tasks unaware that the charger will shut down within a minute or two when the thermostat opens in response to the hot battery. If the thermostat is a manual-reset type, the user will return to find a cooled but uncharged battery.

Thus, there is a need for a thermally-responsive battery charger which will automatically delay the initiation of a charging cycle in the battery is hot when inserted into the charger and will initiate the charging cycle when the battery cools to an appropriate temperature. Further, there is a need for a battery charger which will prevent the charger from reinitiating the charging cycle after the fully charged battery has cooled.

SUMMARY OF THE INVENTION

This invention contemplates a battery charger which includes means for initially determining the temperature of a battery during a period prior to initiating the charging of the battery. In response to the temperature of the battery being at or below a charge-start temperature at least at the end of the period, means are provided for initiating the charging of the battery. When the battery reaches full charge, means are provided for terminating the charging operation.

In addition, this invention contemplates a battery charger with means responsive to the battery being fully charged for preventing the charger from operating in a charge mode even though the temperature of the battery may decrease eventually to or below the charge-start temperature.

Also, this invention contemplates a battery charger which is operable from a primary or first power source and which includes means for developing a second power source internally of the charger in response to the connecting o the battery in the charger.

Further, this invention contemplates a battery charger which includes means for precluding the initial supply of charging current to the battery when the voltage in the charging circuit exceeds a prescribed level to prevent the occurrence of potentially damaging high current spikes.

Additionally, this invention contemplates means responsive to the battery heating to a charge-stop temperature indicative of a fully charged battery for terminating the charging of the battery.

This invention further contemplates means for compensating for any temperature level emanating from any environment other than from the battery from having an influence upon the operation of the means for terminating the charging operation in response to the temperature of the battery at full charge thereof.

Other features and advantages of the present invention will become more fully apparent from the following detailed description of the preferred embodiment, the appended claims and the accompanying drawing.

BRIEF DESCRIPTION OF THE DRAWING

In the accompanying drawings, in which like parts are designated by like reference characters.

DETAILED DESCRIPTION OF THE PREFERRED EMBODIMENT

Figure 1:
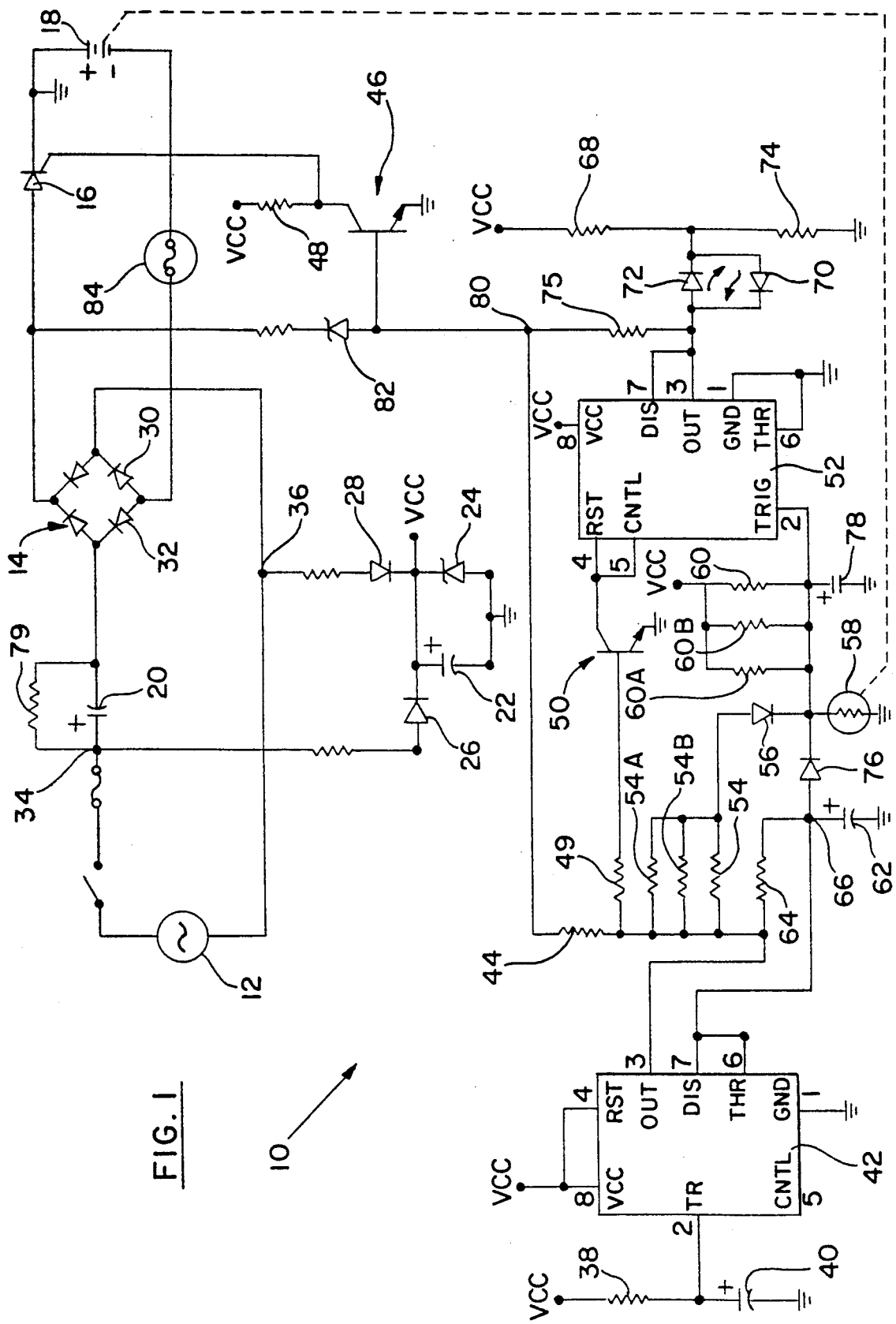
FIG. 1 is a schematic of a thermally responsive battery charger in accordance with certain principles of the invention.

As illustrated in FIG. 1, one embodiment of a battery charger 10 has been designed to avoid the disadvantages noted above with respect to thermostat-controlled chargers while retaining the temperature-responsive aspect for charger control.

In typical fashion, battery charger 10 is operated from a conventional 120 VAC, 60 Hz source 12. The AC voltage of source 12 is rectified by a full wave rectifier 14, the output current of which is supplied selectively through a silicon-controlled rectifier (SCR) 16 to a battery 18 to be charged. A low-impedance capacitor 20 is connected in series between source 12 and rectifier 14 and limits the charging current supplied to battery 18. Capacitor 20 provides a capacitive impedance means which limits the level of charging current supplied to battery 18 to a constant predetermined level sufficient to effect a fast charge of the battery. As one example, if capacitor 20 is valued at 45 micro farads, and with 120 volts being applied by source 12, the constant current would be 1.7 amps. Other capacitance values could be selected for capacitor 20 to obtain different current levels without departing from the spirit and scope of the invention.

In the following description of the operation of charger 10, two conditions will be considered. The operation of charger 10 will be described, first, with respect to the condition when battery 18 is cool (i.e. at or below 40° C.) when inserted into the charger and, secondly, with respect to the condition when the battery is hot (i.e. above 40° C.) when inserted into the charger. Note that in the disclosed embodiment, batteries which are considered sufficiently cool to begin a battery charging operation are usually at or below 40° C. Therefore, this temperature, 40° C., is referred to as the battery-cool temperature.

In the first operating condition, cooled battery 18 is inserted into charger 10 to complete a circuit which establishes a low D.C. voltage source VCC at about fifteen volts. Source VCC is established by charging a capacitor 22. A Zener diode 24 is connected across capacitor 22 and functions to maintain the charged level at approximately fifteen volts. AC current from source 12 is supplied to capacitor 22 on alternate half cycles, through two diodes 26 and 28, respectively, and returns through ground, battery 18 and rectifier diodes 30 and 32, respectively.

Specifically, when point 34 is positive and point 36 is negative, current at a level of about ten milliamps is supplied from point 34 to capacitor 22 through diode 26 and returns through ground, battery 18 and diode 30 to point 36. When point 36 is positive and point 34 is negative, current at the level of about ten milliamps is supplied from point 36 to capacitor 22 through diode 28 and returns through ground, battery 18 and diode 32 to point 34. In this manner, the low voltage source VCC is established and maintained.

Thus, AC source 12 is a first power source and is connectable to charger 10 while low DC voltage source VCC is a second power source which is developed internally of the charger.

It is noted that source VCC is not developed until battery 18 has been connected in charger 10. Thus, the components of charger 10 which require operational voltage from source VCC will not function until battery 18 is connected to the charger.

When source VCC is established, the voltage is initially applied across an RC circuit which includes a resistor 38 and a capacitor 40. Also, the voltage of source VCC is applied to pin 8 of a CMOS RC timer 42 to provide operating power to the timer. Timer 42 is of the type commonly referred to in the industry as a "555" timer and functions as a first control circuit. The output (pin 3) of timer 42 then goes high which is coupled through a resistor 44 to the base of a transistor 46. With the base high, current will flow into the base of transistor 46 which turns on and thereby connects ground to the gate of SCR 16 whereby the SCR is disabled. After a prescribed time as determined by the time constant of resistor 38 and capacitor 40, the trigger (pin 2) of timer 42 rises to a voltage level above two-thirds the VCC level to condition the timer for subsequent switching of the output (pin 3) to a low level as described below.

Thus, at least during the initial operation of charger 10, transistor 46 is on and SCR 16 is not conducting. Since SCR 16 is not conducting, charging current is not being supplied to battery 18 during the initial operation of charger 10.

When the output (pin 3) of timer 42 goes high as noted above, current is supplied through a resistor 49 to the base of a transistor 50 which is thereby turned on to couple ground to the reset input (pin 4) of another "555" CMOS RC timer 52 which functions as a second control circuit. At the time source VCC comes up, conditions are such that the output (pin 3) of timer 52 will be low. The turning on of transistor 50 to cause the reset (pin 4) of timer 52 to go low does not have any effect on the output (pin 3) of the timer at this time. Therefore, the output remains low.

With the output (pin 3) of timer 42 high, current will flow through a resistor 54, a diode 56 and a thermistor 58. Also, with the establishment of source VCC, current flows through a resistor 60 and thermistor 58. Hence, resistors 54 and 60 are in parallel and combine with thermistor 58 to form a voltage divider network. This parallel resistance combination allows thermistor 58 to go above two-thirds the VCC value when the thermistor is cool.

Thermistor 58 is a negative temperature coefficient (NTC) thermally-responsive device, whereby the resistance of the thermistor decreases with an increase in temperature and vice versa. Thermistor 58 is located physically within charger 10 adjacent the position where battery 18 is positioned and functions as the thermal sensor for the charger.

During the initial period of operation of charger 10, after the output (pin 3) of timer 42 has gone high, a capacitor 62 is charging through a resistor 64 eventually to establish a threshold voltage at point 66. Desirably, the threshold voltage should be at least equal to two-thirds the value of the voltage of source VCC. A prescribed time required for capacitor 62 to charge sufficiently to establish the threshold voltage at two-thirds the VCC value is determined by the time constant of the capacitor and resistor 64 and could be, for example, one minute. Other periods could be selected without departing from the spirit and scope of the invention.

Since battery 18 is cool when inserted into charger 10, the threshold voltage at point 66 is attained after the prescribed period of one minute. The threshold voltage at point 66 is coupled to the threshold (pin 6) of timer 42 which functions internally to cause the output (pin 3) to go low. This turns off transistor 46 whereby the gate of SCR 16 goes high and the SCR fires. Charging current is then supplied selectively through SCR 16 to battery 18 in the manner described above. Also, when the output (pin 3) of timer 42 goes low, transistor 50 is turned off whereby the reset (pin 4) of timer 52 goes high through connections internal of timer 52 and the timer is thereby reset. However, the output (pin 3) of timer 52 remains low at this time because other conditions described below have not been attained. Further, diode 56 is now reverse biased and current no longer flows through resistor 54 and the diode.

After SCR 16 fires, charger 10 goes into a fast-charge mode. During this mode, current is flowing through resistor 60 and thermistor 58. Now that the reset (pin 4) of timer 52 is high, the voltage input at the trigger (pin 2) must drop below approximately one-third the value of source VCC to cause the output (pin 3) to go high. When thermistor 58 is cool, the resistance of the thermistor is relatively high. Under this condition, the voltage on the trigger (pin 2) of timer 52 is above one-third of the VCC level, but below two-thirds of the VCC level for all operating conditions, whereby the output (pin 3) of the timer remains low. With the output (pin 3) of timer 52 low, current flows through a resistor 68 and an LED 70 to turn on the LED to indicate that charger 10 is in the fast-charge mode. Also, the low output (pin 3) of timer 52 is coupled to the base of transistor 46 to sustain the non-conducting mode of the transistor.

After battery 18 attains full charge, the battery temperature increases, for example, to a level of 45° C. which causes thermistor 58 also to heat up whereby the resistance of the thermistor decreases. Eventually, the voltage across thermistor 58 drops below the one-third VCC level and all conditions are satisfied whereby the output (pin 3) of timer 52 goes high and enters a charge-stopping mode. This high is coupled to the base of transistor 46 to turn on the transistor. With transistor 46 turned on, SCR 16 is disabled to terminate the fast-charge mode. Thus, the battery temperature of 45° C. represents a charge-stop temperature. The threshold (pin 6) of timer 52 is connected to ground and, therefore, will never exceed a voltage value which is two-thirds VCC. Thus, once the output (pin 3) of timer 52 goes high, it will remain high.

When the output (pin 3) of timer 52 goes high, current ceases to flow through LED 70 which turns off. Current then flows through an LED 72 and a resistor 74 whereby the LED is turned on to indicate that charger 10 has completed the charging of battery 18. It is noted that, when the fast-charge mode is terminated, ten milliamps of current are still flowing through battery 18 by virtue of the continued development of source VCC. This low level current is sufficient to maintain battery 1B in a fully charged state.

Through the base-emitter circuit of transistor 46, a point 80 is very close to ground. This potential is coupled through resistors 44 and 49 to the base of transistor 50 whereby the transistor will not turn on when the output (pin 3) of timer 52 goes high.

When the fully charged battery 18 cools to or below the battery-cool temperature of 40° C., the resistance of thermistor 58 increases to a level whereby the voltage applied to the trigger (pin 2) of timer 52 rises above one-third the VCC level. However, since transistor 50 is not conducting and the threshold (pin 6) is grounded and never exceeds two-thirds the value of VCC, the reset (pin 4) of timer 52 remains high. Also, the output (pin 3) of timer 52 remains high to keep transistor 46 on and, thereby, SCR 16 non-conducting. This is so even though the voltage at the trigger (pin 2) of timer 52 has risen above one-third the VCC level.

In this manner, charger 10 is essentially locked into a no-charge or charge-stopping mode even though battery 18 cools to or below a temperature level (40° C.) which otherwise would have permitted the charger to return to the fast-charge mode. Effectively then, charger 10 remembers that battery 18 has been charged previously and does not have to be recharged. The charge-stopping mode will be sustained until battery 18 is removed and another battery to be charged is connected in charger 10.

In the second operating condition, battery 18 is already hot when it is inserted into charger 10, i.e., the temperature of the battery is above 40° C. Under this condition, the output (pin 3) of timer 42 will still go high initially as noted above and SCR 16 will be disabled.

Also, transistor 50 will be turned on. The heat of battery 18 will be transmitted to thermistor 58 to lower the effective resistance of the thermistor. With current flow through resistors 54 and 60 feeding into thermistor 58, a voltage below two-thirds the VCC voltage is developed across the thermistor and clamps the threshold (pin 6) of timer 42 through a diode 76 to the thermistor voltage. This prevents the threshold (pin 6) of timer 42 from reaching the threshold voltage level necessary to cause the output (pin 3) of the timer 42 to go low. Also, since transistor 50 is still on, timer 52 is in the reset mode. Thus the changing voltage level appearing across thermistor 58, and thereby appearing at the trigger (pin 2) of timer 52, will have no effect on the timer operation. Therefore, the output (pin 3) of timer 52 remains low.

This delay beyond the prescribed period is sustained until battery 18 cools sufficiently to or below the battery-cool temperature of 40° C. to permit the voltage across thermistor 58 to rise to a level whereby the threshold (pin 6) of timer 42 exceeds the two-thirds VCC voltage level necessary to cause the output (pin 3) to go low. At this time, transistor 46 is turned off, SCR 16 is fired and the fast-charge current is thereby supplied to battery 18. Also, transistor 50 is turned off to reset timer 52 and diode 56 is reverse biased to preclude current flow through resistor 54. The charging cycle then proceeds in the same manner as described above with respect to a initially cool battery 18 being connected to charger 10.

It is important to note that charger 10 will first sense the temperature condition of a hot battery 18 upon connection to the charger. Then battery 18 is permitted to cool and is charged fully whereafter the battery becomes hot again. Charger 10 senses that battery 18 is hot and stops the charging operation but remembers, in effect, that this is the second sensing of the hot battery and will not allow the charging cycle to begin again even though the battery may cool to a temperature below 40° C.

Trim resistors 54A, 54B, 60A and 60B are provided initially in charger 10 and are adjusted at the factory to compensate for a twenty-percent tolerance factor usually encountered with thermistors such as thermistor 58. In this manner, every charger 10 will be set to respond to the same cut-off temperature level of battery 18 in controlling operation of the charger.

A capacitor 78 is connected in parallel with thermistor 58 to insure that the voltage across the thermistor is stable and not affected by spurious noise signals.

A resistor 79 is connected in parallel with capacitor 20 to provide a discharge path for the energy stored in the capacitor when SCR 16 is turned off, when battery 18 is removed or when charger 10 is disconnected from AC source 12.

As noted above, transistor 46 is controlled through timer 42 to selectively fire SCR 16 at the start of a charge cycle. Prior to the starting of the charge cycle, SCR 16 is not conducting and, consequently, there is no current flow through capacitor 20. Therefore, capacitor 20 is fully discharged. Under this condition, the voltage appearing across the anode and cathode of SCR 16 is equal at any instant to the output voltage of AC source 12 minus the voltage of battery 18 waiting to be charged. If SCR 16 is fired in response to the output of timer 42 going low as described above, the voltage suddenly shifts from the fired SCR to capacitor 20. Since capacitor 20 is a relatively low-impedance device, and if the firing of SCR occurs during a period when the alternating voltage of source 12 is high (i.e. well ahead of or well beyond the zero-crossover of the voltage waveform), an extremely high spike of current will occur which could damage capacitor 20, the diodes of rectifier 14, SCR 16 and perhaps other elements of charger 10.

To preclude this high spike of current from occurring, the base of transistor 46 is connected through a Zener diode 82 to the anode of SCR 16 to provide a means for permitting the SCR to fire initially in each charge cycle only when the anode-cathode voltage of the SCR is relatively low. In effect, diode 82 and the base-emitter circuit of transistor 46 are monitoring the voltage appearing across SCR 16. When the voltage across SCR 16 exceeds the breakdown voltage of Zener diode 82, the high appearing at the anode of the SCR is coupled to the base of transistor 46 whereby the transistor is turned on. This grounds the gate of SCR 16 and thereby prevents the SCR from firing. When the voltage across SCR 16 is below the breakdown voltage of Zener diode 82, transistor 46 is shut down and the gate of SCR 16 is high whereby the SCR fires. The breakdown level of Zener diode 82 is set so that SCR 16 can fire at voltage levels slightly below and above the zero crossover of the voltage waveform of AC source 12. In this manner, a small window at a very low voltage level is provided for initial firing of SCR 16 and the SCR is precluded from firing at higher voltage levels of AC source 12.

Therefore, if the output (pin 3) of timer 42 goes low to start the charge cycle at a time when the voltage level of AC source 12 is outside the window levels, Zener diode 82 will have already broken down and transistor 46 continues to conduct thereby preventing SCR 16 from firing. Upon occurrence of the next window, Zener diode 82 is no longer conducting and the continued low output of timer 42 turns off transistor 46. At this time, SCR 16 fires in the safe voltage region of the window and the fast-charge cycle begins. Thus, a high current spike will not occur and the various components of charger 10 are thereby protected.

During normal operation of battery charger 10, the voltage of capacitor 20 will be in sync with and will follow the voltage of A.C. source 12. However, conditions could occur within charger 10 where the varying voltage of source 12 and the voltage of capacitor 20 would be cumulative and, therefore potentially harmful. For example, if battery 18 is removed from charger 10, capacitor 20 will begin to discharge through bleeder resistor 79. If another battery 18 is inserted before capacitor 20 is fully discharged, A.C. source 12 and capacitor 20 may be out of sync whereby the voltages from the source and the capacitor could be cummulative. If SCR 16 was permitted to fire during a period when the cummulative voltage was high, damage to components of charger 10 could occur. However, because of the presence of Zener diode 82, SCR 16 is prevented from firing during periods of high cummulative voltage in the same manner described above with respect to the zero-crossover situation. This prevents any damage to components of charger 10.

Other conditions could occur which could result in the cumulative voltage effect such as, for example, accidental movement of battery 18 within its connection in charger 10. When such movement occurs, charger 10 senses a momentary disconnect which creates the condition noted above where capacitor 20 starts to discharge. When battery 18 is reconnected, capacitor 20 begins to charge again and could be out of sync with A.C. source 12 whereby the cumulative voltage effect could occur. Again, the presence of Zener diode 82 prevents premature firing of SCR 16 thereby avoiding damage to the components of charger 10.

If any malfunction occurs within charger 10 which causes SCR 16 to remain in the conducting state after battery 18 is fully charged, charging current would continue to be supplied to the battery. Eventually, battery 18 would melt resulting in a catastrophic event which would destroy the battery and possibly cause serious injury to the user of charger 10. To prevent this catastrophic event from occurring, a thermal fuse 84 is connected in the series path of the charging current and is physically located within charger 10 adjacent the location of battery 18. If the temperature of battery 18 exceeds a prescribed level (e.g., 80° C.) which is indicative of serious overcharge, the temperature of the battery will cause thermal fuse 84 to open whereby charging current ceases to flow. In this manner, a catastrophic event of battery meltdown and possible user injury is avoided.

In the physical arrangement of charger 10, the components thereof, including thermistor 58, are located within a housing (not shown). Even though thermistor 58 is located adjacent the location of battery 18 for the above-described purpose, the heat generated by the components within the environment of the housing, as well as the temperature of the environment outside of the housing also has an effect on the thermistor.

Resistor 60 and any of the remaining trim resistors 60A and 60B are located in the current-feed path of thermistor 58 and represent a fixed resistance. As the temperature within the housing rises, and as the battery temperature rises, the combined effect of these dual temperature increases causes the resistance of thermistor 58 to decrease. Since the resistance of resistor 60 and any remaining trim resistors 60A and 60B is fixed, the voltage drop across the decreasing resistance of thermistor 58 will decrease more rapidly in response to the dual temperature increases than it would have decreased solely in response to the battery temperature. Thus, the thermistor voltage drop will fall to a level below the one-third VCC level before battery 18 reaches full charge and the charging operation will be prematurely terminated.

Figure 2:
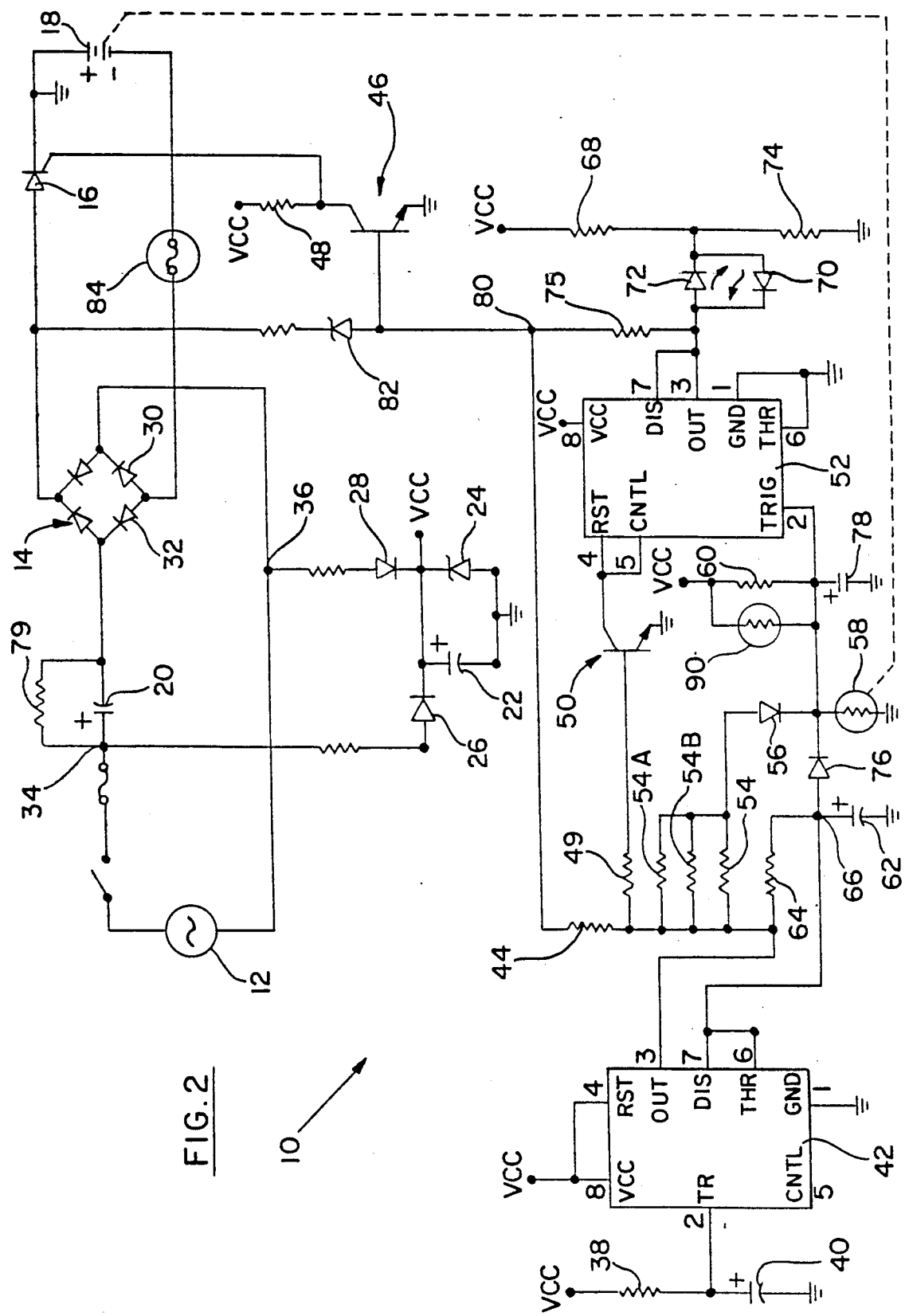
FIG. 2 is a schematic of the thermally responsive battery charger of FIG. 1 with facility for temperature compensation in accordance with certain principles of the invention.

The preferred embodiment of the invention is illustrated in FIG. 2 wherein battery charger 10 has been modified to include a second NTC thermistor 90 in place of trim resistors 60A and 60B to compensate for the dual termperature effect. Thermistor 90 is connected in parallel with resistor 60 and is located in the current-feed path of thermistor 58.

Thermistor 90 is located physically within the charger housing so as to be affected only by the heat within the environment of the housing and the environment outside of the housing and not by the heat from battery 18.

As the charging operation progresses, the dual temperature effect causes the resistance of thermistor 58 to decrease which would heretofore cause the voltage drop across the thermistor to also decrease accordingly together with an increase in the voltage drop across resistor 60. However, with thermistor 90 now in parallel with resistor 60, and with the temperature within the charger housing increasing due to heat generated by the charger components and the temperature of the environment outside the housing, the resistance of thermistor 90 also decreases to reduce the effective resistance of the parallel-connected resistor 60 and thermistor 90. This creates a condition where the resistances of both thermistors 58 and 90 are decreasing as current therethrough increases. However, since the effective resistance of the parallel circuit of thermistor 90 and resistor 60 is decreasing along with the decrease of resistance of thermistor 58, the ratio of the respective voltage drops across the two thermistors changes at a slower rate than in the prior circuit which did not include thermistor 90. This allows the passage of additional time before the voltage drop across thermistor 58 falls below the one-third VCC level necessary for terminating the charging cycle and thereby compensates for the dual temperature effect.

As an alternative, a positive temperature coefficient thermistor could be placed in the housing and connected in parallel with thermistor 58 to provide a temperature compensating effect.

If charger 10 is used in an environment in which the ambient temperature external of the housing is low, the resulting cool interior of the housing also could have an effect on the ability of thermistor 58 to respond accurately to the temperature of battery 18. For example, although thermistor 58 is located adjacent battery 18, the thermistor is also located within the housing of charger 10 wherein the cooling effect from the ambient temperature could slow the rate of decrease of thermistor resistance even though the temperature of the battery is increasing. In this instance, battery 18 will continue to charge beyond full-charge until sufficient heat has been generated by the battery to cause the voltage drop of thermistor 58 to fall below one-third VCC to thereby terminate the charging cycle.

To counter the cooling effect, the inclusion of thermistor 90 in charger 10 also compensates for the cool temperature in a manner similar to that described above with respect to the high temperature effect.

Therefore, thermistor 90 facilitates temperature compensation for charger 10 for temperatures above and below a desired ambient operating temperature both inside and outside the housing.

In summary, charger 10 provides a system for delaying the initiation of a fast-charge cycle to provide sufficient time to electronically analyze the condition of battery 18. If battery 18 is cool, (i.e., at or below 40° C.) charger 10 will proceed through a fast-charge cycle and thermally respond to the attainment of full charge of the battery and thereby stop the charging operation. If battery 18 is hot (i.e., above 40° C.) when it is inserted into charger 10, the initial delay provides the charger with sufficient time to thermally respond to the hot battery and to delay further the initiation of the charge cycle until the battery has sufficiently cooled. When battery 18 heats again due to attaining full charge, charger 10 stops the charge cycle and will not permit the restarting of the charge cycle even though the battery may cool well below the trip temperature of 40° C.

Further, charger 10 includes a unique low voltage supply VCC which is not developed until battery 18 is connected in the charger. This keeps all low-voltage operable devices and components in the non-operating state until operation thereof is required. Also, charger 10 insures that a charging current switch, i.e. SCR 16, will only fire initially within a relatively small window at low level voltage portions of the AC input to avoid the occurrence of potentially damaging, extremely high current spikes in the charging circuit.

Charger 10 is particularly suitable for charging Ni-Cd battery packs having a wide range of cells, for example, from one to twenty cells without experiencing fluctuations in the level of charging current. For example, as noted above, a current level of 1.7 amps is attained with the described circuit parameters which is sufficient to charge one to twenty cells in about one hour. Thus, the inventive circuit design of charger 10 could be used to provide a single fast or one-hour charging facility for a full line of cordless products which employ batteries of different voltage levels and which include cells in a range from one to twenty. This eliminates the need for a plurality of chargers to accommodate different voltage levels of the full line of such cordless products.

Also, even though the charging current would decrease for batteries having more than twenty cells, the circuit of charger 10 would still perform the charging operation at a slower rate. Further, other circuit parameters could be used to attain different charging periods.

The above-described embodiment, of course, is not to be construed as limiting the breadth of the present invention. Modifications, and other alternative constructions, will be apparent which are within the spirit and scope of the invention as defined in the appended claims. For example, one of the upper diodes of rectifier 14 could be replaced with an SCR, or both upper diodes could be replaced with SCR's. In either case, the SCR's would be a substitute for SCR 16. In this manner, the switch control performed by SCR 16 would then be performed by the single SCR or dual SCR's in rectifier 14 in a manner similar to the performance of SCR 16. The biasing controls for the SCR's in the rectifier would be the same as that provided for SCR 16.

What is claimed is:

1. A battery charger, which comprises:
   a charging circuit for supplying charge current to a battery;
   a first control circuit connectable to the charging circuit and operable independently of the charging circuit and the supplying of charge current thereby for delaying the supply of current to the battery for a prescribed period prior to charging the battery;
   a thermally-responsive device located adjacent the battery for providing an indication of the temperature of the battery at any time prior to and during the charging of the battery;
   means responsive to the thermally-responsive device indicating at the end of the prescribed period that the battery temperature is at or below a battery-cool temperature at which the charger would normally enter a charging mode for operating the charging circuit to initiate the charging of the battery;
   a second control circuit responsive to the thermally-responsive device indicating that the battery temperature is at or below a charge-stop temperature representative of the battery being fully charged for terminating operation of the charging circuit upon reaching the charge-stop temperature; and
   means responsive to the battery being fully charged for preventing the charger from operating in a charging mode even though the temperature of the battery may decrease to or below the battery-cool temperature.

2. The battery charger as set forth in claim 1, which further comprises:

means responsive to the thermally-responsive device indicating during the prescribed period that the temperature of the battery is above the battery-cool temperature for delaying the supply of current to the battery until the temperature of the battery decreases at least to or below the battery-cool temperature; and whereafter the operating means initiates the charging of the battery.

3. The battery charger as set forth in claim 1 wherein the thermally-responsive device is a first thermally-responsive device, and the battery charger further comprises:

a second thermally-responsive device connected in circuit with the first thermally-responsive device and responsive to and compensating for any temperature level emanating from any environment other than from the battery so that the supplying of current through the charging circuit is terminated essentially in response to the battery being fully charged.

4. The battery charger as set forth in claim 1, wherein the operating means includes a silicon-controlled rectifier which, upon firing, connects the charging circuit to the battery.

5. The battery charger as set forth in claim 1, wherein the preventing means includes:

the second control circuit; and means for maintaining the second control circuit in the mode of stopping operation of the charging circuit.

6. The battery charger as set forth in claim 1, which further comprises:

means for connecting an AC power source to the charger;

a capacitor;

means for charging the capacitor from the AC power source in response to the battery being connected in the charger;

means for limiting the voltage to which the capacitor can charge to a selected level to establish a voltage source at the selected level;

means for coupling the voltage source to the first and second circuits to provide operating voltage therefor.

7. The battery charger as set forth in claim 1, which further comprises:

capacitive impedance means for limiting the level of charging current applied to the battery to a constant predetermined level sufficient to effect a fast charge of the battery 8. The battery charger as set forth in claim 1, wherein each of the first and second control circuits is a CMOS RC timer.

9. The battery charger as set forth in claim 6, which further comprises:

the voltage source supplying a low level current to the battery to maintain the battery at full charge after the charging operation has been stopped.

10. A battery charger, which comprises:

means for supplying a current for fast charging a battery;

means operable independently of the current supplying means for controlling the current supplying means to supply current to the battery to charge the battery during a charging operation;

means responsive to the battery heating to a charge-stop temperature indicative of the battery being fully charged for terminating the charging operation;

means responsive to the battery being fully charged and operable independently of the controlling means for preventing the controlling means from reinitiating the supply of current from the supplying means to the battery even though the temperature of the battery may decrease to or below a battery-cool temperature at which the charger would normally enter into a charging mode; and wherein the terminating means includes:

switching means for connecting the current supplying means to the battery;

a first thermally-responsive device responsive to the battery heating to the charge-stop temperature for developing a voltage at a prescribed level representative thereof;

means responsive to the development of the voltage by the thermally-responsive device for controlling the switching means to disconnect the current supplying means from the battery; and a second thermally-responsive device connected to circuit with the first thermally-responsive device and responsive to and compensating for any temperature level emanating from any environment other than from the battery so that the current supplying means is disconnected essentially in response to the battery being fully charged.

11. The battery charger as set forth in claim 11, which further comprises:

means responsive to the connecting of the battery in the charger for developing a second power source to provide operational voltage for the controlling means independently of the current supplying means.

12. The battery charger as set forth in claim 10, wherein the charging means includes:

capacitive impedance means for limiting the level of charging current applied to the battery to a constant predetermined level sufficient to effect a fast charge of the battery.

13. The battery charger as set forth in claim 10, wherein the preventing means includes:

the first thermally-responsive device responsive to the battery heating to the charge-stop temperature for developing a voltage at a prescribed level representative thereof;

a control circuit responsive to the development of the voltage at the prescribed level for selectively disconnecting the current supplying means from the battery; and means for biasing the control circuit operation to maintain the disconnection of the current supplying means from the battery even though the first thermally-responsive device senses that the temperature of the battery has decreased to or below the battery-cool temperature.

14. A battery charger, which comprises:

a charging circuit for supplying current to a battery;

a first control circuit connectable to the charging circuit for delaying the supply of current to the battery for a prescribed period prior to charging the battery;

a thermally-responsive device located adjacent the battery for providing an indication of the temperature of the battery at any time prior to and during the charging of the battery;

means responsive to the thermally-responsive device indicating at the end of the present period that the battery temperature is at or below a battery-cool temperature at which the charger would normally enter a charging mode for operating the charging circuit to initiate the charging of the battery;

a second control circuit responsive to the thermally-responsive device indicating that the battery temperature is at or below a charge-stop temperature representative of the battery being fully charged for terminating operation of the charging circuit upon reach the charge-stop temperature;

means responsive to the battery being fully charged for preventing the charger from operating in a charging mode even though the temperature of the battery may decrease to or below the battery-cool temperature; and a second thermally-responsive device connected in circuit with the first thermally-responsive device and responsive to and compensating for any temperature level emanating from any environment other than from the battery so that the supplying of current through the charging circuit is terminated essentially in response to the battery being fully charged.

15. A battery charger, which comprises:

a charging circuit for supplying current to a battery;

a first control circuit connectable to the charging circuit for delaying the supply of current to the battery for a prescribed period prior to charging the battery;

a thermistor located adjacent the battery for providing an indication of the temperature of the battery at any time prior to and during the charging of the battery;

means responsive to the thermally-responsive device indicating at the end of the prescribed period that the battery temperature is at or below a battery-cool temperature at which the charger would normally enter a charging mode for operating the charging circuit to initiate the charging of the battery;

a second control circuit responsive to the thermally-responsive device indicating that the battery temperature is at or below a charge-stop temperature representative of the battery being fully charged for terminating operation of the charging circuit upon reach the charge-stop temperature; and means responsive to the battery being fully charged for preventing the charger from operating in a charging mode even though the temperature of the battery may decrease to or below the battery-cool temperature.

16. A battery charger, which comprises:

a charging circuit for supplying current to a battery;

a first timer circuit connectable to the charging circuit for delaying the supply of current to the battery for a prescribed period prior to charging the battery;

a thermally-responsive device located adjacent the battery for providing an indication of the temperature of the battery at any time prior to and during the charging of the battery;

means responsive to the thermally-responsive device indicating at the end of the prescribed period that the battery temperature is at or below a battery-cool temperature at which the charger would normally enter a charging mode for operating the charging circuit to initiate the charging of the battery;

a second timer circuit responsive to the thermally-responsive device indicating that the battery temperature is at or below a charge-stop temperature representative of the battery being fully charged for terminating operation of the charging circuit upon reaching the charge-stop temperature; and means responsive to the battery being fully charged for preventing the charger from operating in a charging mode even though the temperature of the battery may decrease to or below the battery-cool temperature.

* * * * *